(12) United States Patent
Fujioka (10) Patent No.: US 6,609,965 B2
(45) Date of Patent: Aug. 26, 2003

(54) CUTTING BLADE

(75) Inventor: Seiji Fujioka, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 10/127,539

(22) Filed: Apr. 23, 2002

(65) Prior Publication Data

US 2002/0168929 A1 Nov. 14, 2002

(30) Foreign Application Priority Data

May 9, 2001 (JP) .......................... 2001-138321

(51) Int. Cl.[7] .................. B24D 5/14; B28D 1/04
(52) U.S. Cl. .................. 451/547; 451/548; 125/15
(58) Field of Search .................. 451/547, 548, 451/127; 125/12, 13.01, 15, 20, 23.01

(56) References Cited

U.S. PATENT DOCUMENTS 3,886,925 A * 6/1975 Regan .................. 125/15
4,180,048 A * 12/1979 Regan .................. 125/15

FOREIGN PATENT DOCUMENTS

| JP | 03270880 A | * | 12/1991 | .......... B24D/05/12 |
| JP | 09225931 A | * | 9/1997 | .......... B28D/05/02 |
| JP | 2001205568 A | * | 7/2001 | .......... B24D/05/12 |

* cited by examiner

Primary Examiner—Lee D. Wilson
Assistant Examiner—David B. Thomas
(74) Attorney, Agent, or Firm—Smith, Gambrell & Russell, LLP (57) ABSTRACT

A cutting blade having an annular cutting edge portion composed of electroformed abrasive grain layers in which abrasive grains are fixed by electroforming, the annular cutting edge portion being composed of a central electroformed abrasive grain layer and outer electroformed abrasive grain layers formed on both sides of the central electroformed abrasive grain layer. The central electroformed abrasive grain layer is an abrasive grain layer having a low concentration and the outer electroformed abrasive grain layers are each an abrasive grain layer having a higher concentration than the central electroformed abrasive grain layer.

5 Claims, 7 Drawing Sheets

CUTTING BLADE

FIELD OF THE INVENTION

The present invention relates to a cutting blade suitable for cutting a semiconductor plate, particularly a semiconductor plate obtained by resin-molding a plurality of semiconductor chips which are arranged in a matrix form and of which adjacent semiconductor chips are connected with each another via a plurality of electrodes, along cutting lines formed at the intermediate portions of the above electrodes.

DESCRIPTION OF THE PRIOR ART

In the production process of a semiconductor device, semiconductor chips are individually produced by forming a circuit such as IC or LSI in a plurality of areas arranged in a lattice form on the surface of a substantially disk-like semiconductor wafer and dicing the areas having circuit formed therein along predetermined cutting lines called "streets". The thus divided semiconductor chips are packaged, and the semiconductor chip package is widely used in electric appliances such as portable telephones and personal computers.

Lighter and smaller electric appliances such as portable telephones and personal computers are now in growing demand, and packaging technologies called "chip size package (CSP)" which can reduce the size of a semiconductor chip package have been developed. As one of the chip size package (CPS) technologies, a packaging technology called "Quad Flat Non-lead Package (QFN)" has been put into practice. This packaging technology called "QFN" will be described with reference to FIG. 6 and FIG. 7.

Figure 6:
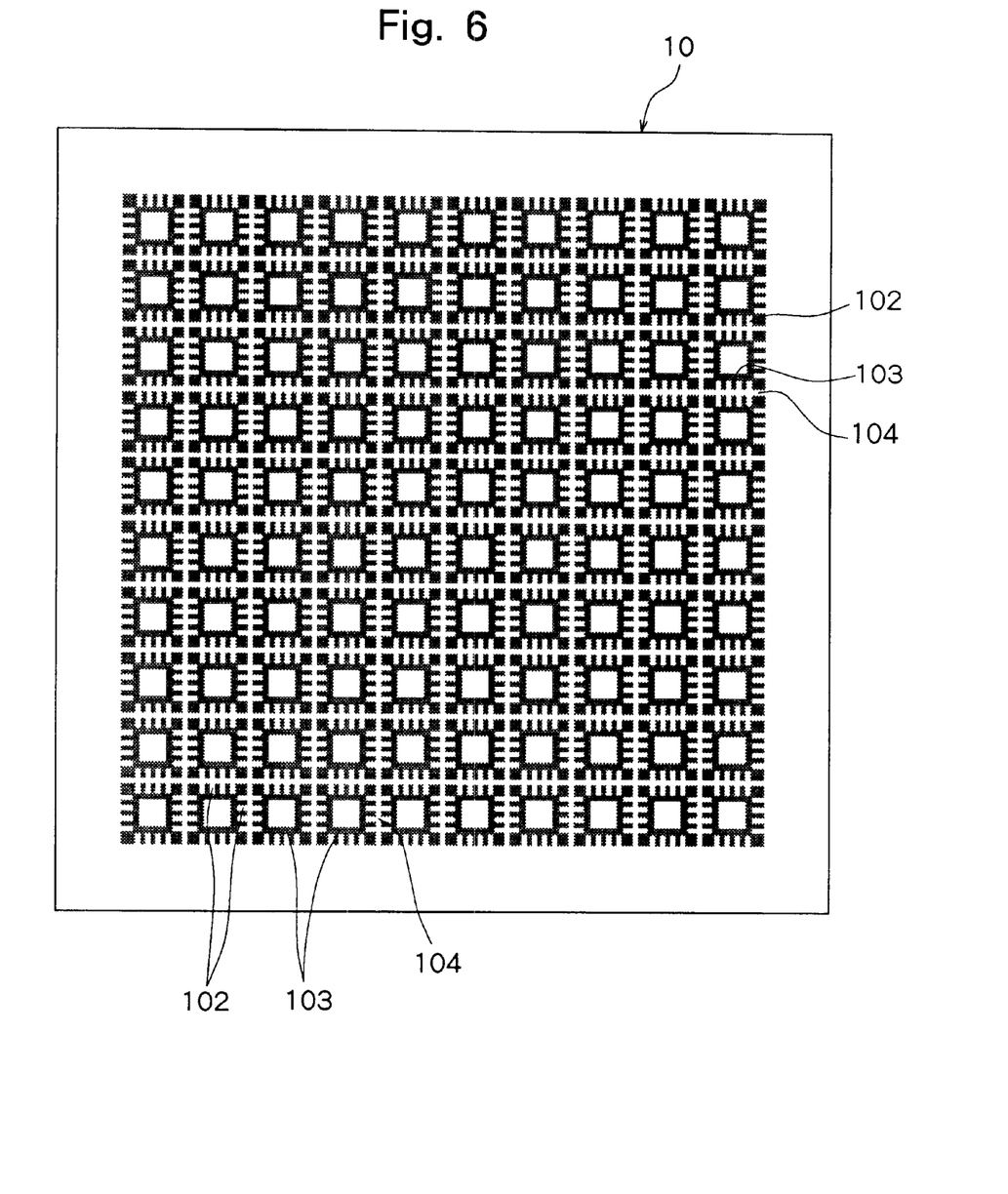
FIG. 6 is a plan view of a semiconductor plate as a workpiece in the present invention.
Figure 7:
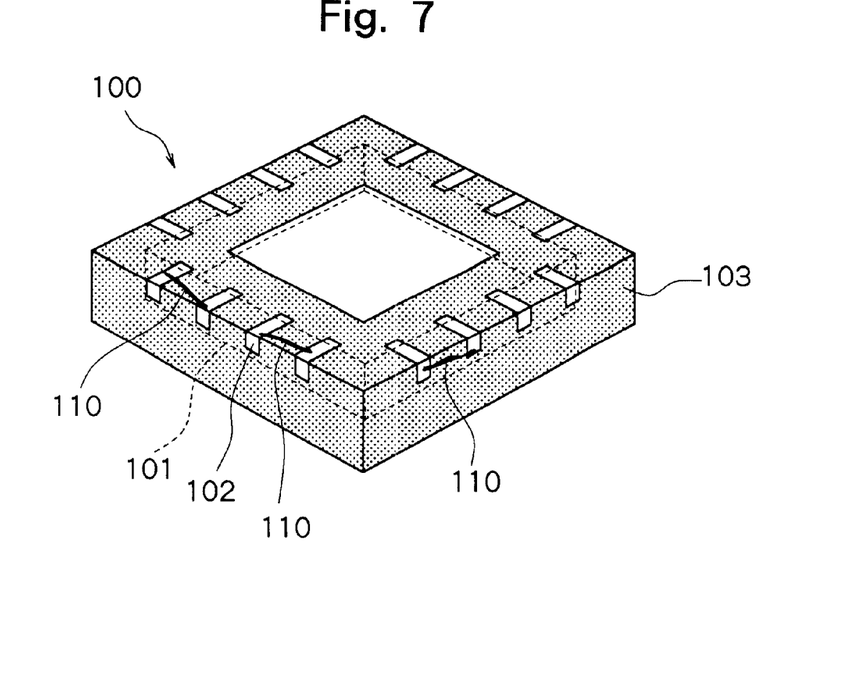
FIG. 7 is a perspective view of a semiconductor package obtained by dividing the semiconductor plate shown in FIG. 6.

According to the packaging technology called "QFN", a semiconductor plate 10 is formed by molding a plurality of semiconductor chips 101 (see FIG. 7) arranged in a matrix form and a plurality of electrodes 102 for connecting adjacent semiconductor chips as shown in FIG. 6, together with a resin 103. This semiconductor plate 10 is cut along cutting lines 104 called "streets" formed at the intermediate portions of the electrodes 102 which connect adjacent semiconductor chips so that it is divided into individually packaged semiconductor chips 100 (semiconductor packages) as shown in FIG. 7. The above electrodes 102 and the above cutting lines 104 are formed of a metal plate such as a copper plate.

The above semiconductor plate 10 is generally cut by a precision cutting machine called "dicing machine". This dicing machine has a cutting blade having annular abrasive grain layer, and the cutting blade and the semiconductor plate relatively move along the cutting lines 104 formed in the semiconductor plate 10 to cut the semiconductor plate 10 along the cutting lines 104 and divide it into individual semiconductor packages 100 as shown in FIG. 7.

Figure 8:
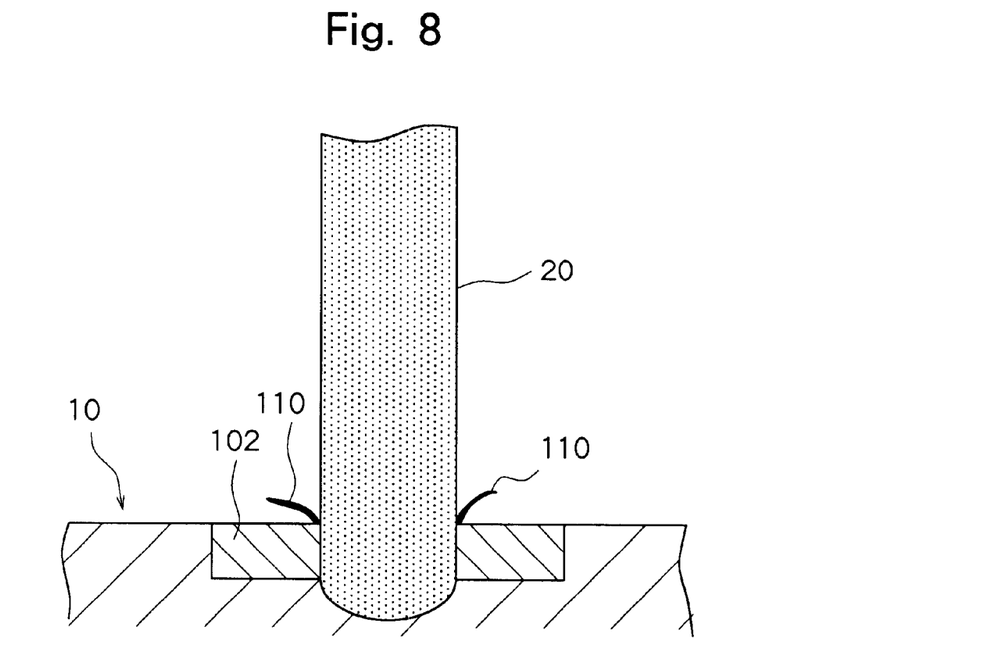
FIG. 8 is a diagram for explaining a state of a semiconductor plate being cut with a cutting blade of the prior art.

However, the electrodes 102 which connect adjacent semiconductor chips 101 in the state of the above semiconductor plate 10 are formed of a metal plate such as a copper plate, and when the intermediate portion of the electrode 102 is cut with the cutting blade 20 along the street 104, as shown in FIG. 8, such a problem exists that burrs 110 are generated and cause a short-circuit between the electrodes 102 of each semiconductor package 100 as shown in FIG. 7. It has been found that burrs are generated when the electrodes 102 made of a soft and viscous material such as copper are cut and forced out on both sides of the cutting blade 20 because the contour surface of the cutting blade 20 has substantially a convex arc surface in cross section.

The Applicant proposes in Unexamined Japanese Patent Application No. 2000-307541 a cutting blade composed of an annular central abrasive grain layer and outer abrasive grain layers formed on both sides of the central abrasive grain layer, the central abrasive grain layer having a smaller diameter than the outer abrasive grain layers to form an annular depression in the peripheral surface, as a cutting blade which can prevent the generation of burrs when the above semiconductor plate is cut with the cutting blade along the cutting lines.

Although the semiconductor plate can be cut with the above cutting blade without generating burrs, the cutting blade is not satisfactory from the standpoint of production, and further improvement of the cutting blade is desired.

SUMMARY OF THE INVENTION

It is an object of the present invention to provide a cutting blade which can prevent the generation of burrs when the above semiconductor plate is cut along the cutting lines, and can be easily produced.

According to the present invention, the above object can be attained by a cutting blade having an annular cutting edge portion composed of electroformed abrasive grain layers in which abrasive grains are fixed by electroforming, wherein the annular cutting edge portion is composed of a central electroformed abrasive grain layer and outer electroformed abrasive grain layers formed on both sides of the central electroformed abrasive grain layer; and the central electroformed abrasive grain layer is an abrasive grain layer having a low concentration, and the outer abrasive grain layers are each an abrasive grain layer having a higher concentration than the central electroformed abrasive grain layer.

It is desired that the above central electroformed abrasive grain layer be formed of an abrasive grain layer having a concentration of 0 to 100 and that the outer electroformed abrasive grain layers be formed of each an abrasive grain layer having a concentration of 200 to 300.

The grain diameter of the above abrasive grains is set to $\frac{1}{10}$ to $\frac{1}{3}$ the thickness of the above annular cutting edge portion. It is desired that the thickness of the annular cutting edge portion be set to 200 to 300 $\mu$m and that the grain diameter of the abrasive grains be set to 20 to 60 $\mu$m. Further, the abrasive grains are desirably diamond abrasive grains.

DETAILED DESCRIPTION OF THE PREFERRED EMBODIMENTS

Preferred embodiments of the cutting blade of the present invention will be described in detail hereinafter with reference to the accompanying drawings.

Figure 1:
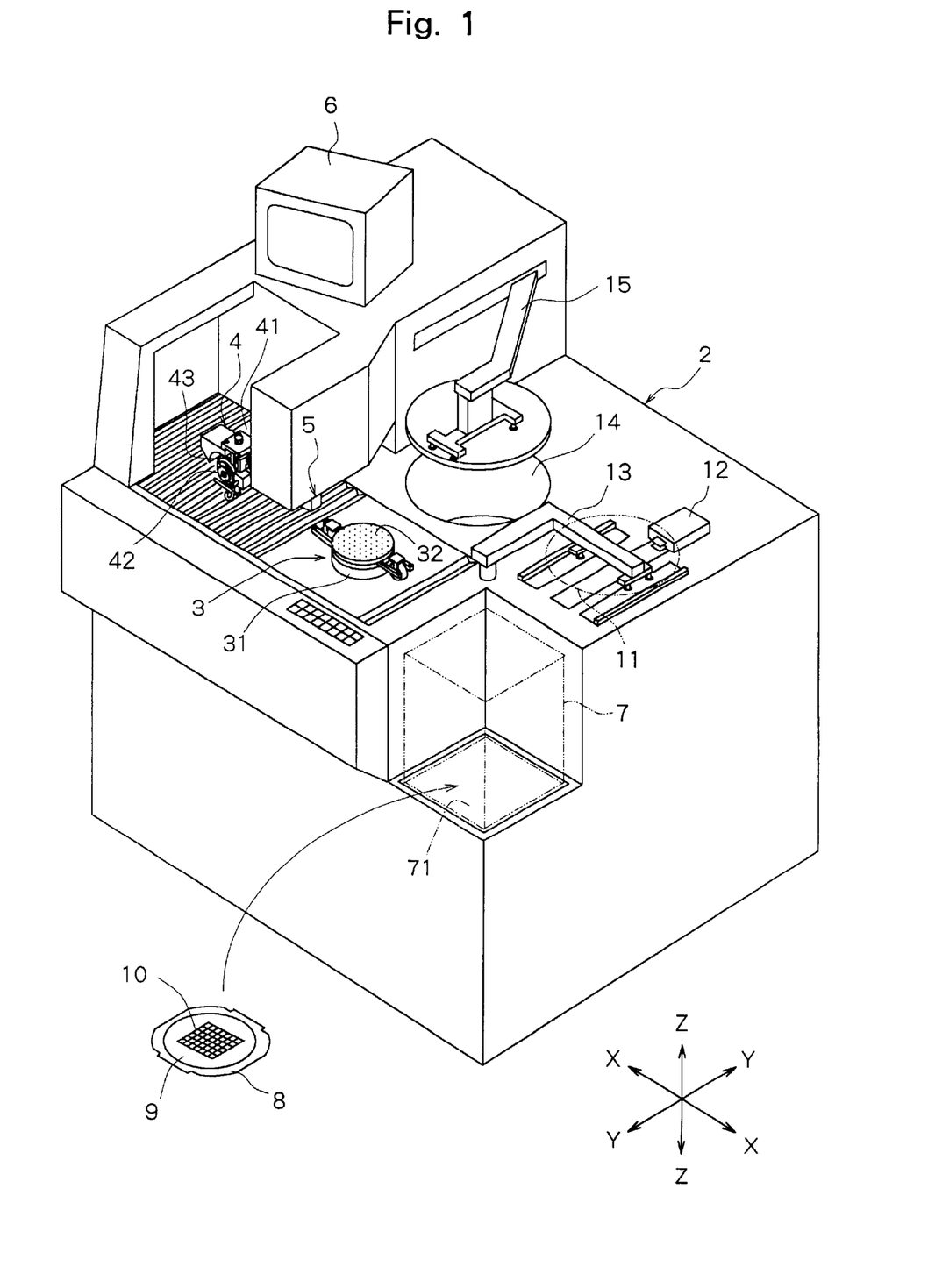
FIG. 1 is a perspective view of a dicing machine as a cutting machine for carrying out the method of dividing a semiconductor plate according to the present invention.

FIG. 1 is a perspective view of a dicing machine as a cutting machine for carrying out the method of dividing a semiconductor plate according to the present invention.

The dicing machine in the illustrated embodiment has a substantially rectangular parallelepiped housing 2. In this housing 2, a chuck table 3 for holding a workpiece is mounted in such a manner that it can move in a direction shown by an arrow X which is a cut-feeding direction. The chuck table 3 comprises an adsorption chuck support base 31 and an adsorption chuck 32 mounted on the adsorption chuck support base 31, and the semiconductor plate 10 shown in FIG. 7 as a workpiece is held on the mounting surface of the adsorption chuck 32 by a suction means that is not shown. The chuck table 3 is constructed rotatably by a rotating unit that is not shown.

The dicing machine in the illustrated embodiment has a spindle unit 4 as a cutting means. The spindle unit 4 comprises a spindle housing 41 which is mounted on a movable base that is not shown and moved in a direction shown by an arrow Y which is an indexing direction and a direction shown by an arrow Z which is a cutting-in direction, a rotary spindle 42 which is rotatably supported by the spindle housing 41 and rotated by a rotary drive unit that is not shown and a cutting blade 43 mounted to the rotary spindle 42. The cutting blade 43 will be described later in detail.

The dicing machine in the illustrated embodiment comprises an imaging unit 5 for imaging the surface of the workpiece held on the surface of the adsorption chuck 32 constituting the above chuck table 3 to detect an area to be cut with the above cutting blade 43 and confirm the state of a cut groove. This imaging unit 5 is constructed by an optical means such as a microscope, CCD camera or the like. The dicing machine comprises a display means for displaying an image obtained by this imaging unit 5.

The dicing machine in the illustrated embodiment comprises a cassette 7 for storing workpieces to be treated. In the illustrated embodiment, a semiconductor plate 10 shown in FIG. 6 above is used as the workpiece. The semiconductor plate 10 is supported on a support frame 8 by tape 9 and stored in the above cassette 7 in a state of being supported on the support frame 8. The cassette 7 is placed on a cassette table 71 which can be moved vertically by an ascending/descending means that is not shown.

The dicing machine in the illustrated embodiment comprises a workpiece taking-out means 12 for taking out the semiconductor plate 10 as the workpiece stored in the cassette 7 in a state of being supported on the support frame 8 by the tape 9 and carrying it to a workpiece placing area 11, a workpiece conveying means 13 for conveying the semiconductor plate 10 taken out by the workpiece taking-out means 12 to the top of the above chuck table 3, a cleaning means 14 for cleaning the semiconductor plate 10 cut on the chuck table 3 and a cleaning/conveying means 15 for conveying the semiconductor plate 10 cut on the chuck table 3 to the cleaning means 14.

A brief description is subsequently given of the processing action of the above-described dicing machine.

The semiconductor plate 10 in a state of being supported on the support frame 8 by the tape 9, stored at a predetermined position of the cassette 7 (this semiconductor plate 10 in a state of being supported on the support frame 8 by the tape 9 will be simply referred to as "semiconductor plate 10" hereinafter) is brought to a take-out position by the vertical movement of the cassette table 71 by the ascending/descending means that is not shown. Thereafter, the semiconductor plate 10 brought to the take-out position is carried to the workpiece placing area 11 by the advance or retreat movement of the workpiece taking-out means 12. The semiconductor plate 10 carried to the workpiece placing area 11 is then conveyed to the placing surface of the adsorption chuck 32 constituting the above chuck table 3 by the turning movement of the workpiece conveying means 13, and suction-held to the adsorption chuck 32. The chuck table 3 suction-holding the semiconductor plate 10 is moved to right below the imaging unit 5. When the chuck table 3 is positioned right below the imaging unit 5, cutting lines 104 (see FIG. 6) formed in the semiconductor plate 10 are detected by the imaging unit 5, and a precision positioning work is carried out by moving, for adjusting, the semiconductor plate 10 to the direction shown by the arrow Y, which is the indexing direction of the spindle unit 4.

Thereafter, while the cutting blade 43 is rotated in a predetermined direction, the chuck table 3 suction-holding the semiconductor plate 10 is moved in the direction shown by the arrow X, which is the cut-feeding direction (direction perpendicular to the rotary shaft of the cutting blade 43) at a cut-feeding rate of, for example, 30 mm/sec, whereby the semiconductor plate 10 held on the chuck table 3 is cut with the cutting blade 43 along the predetermined cutting line (street). That is, since the cutting blade 43 is mounted to the spindle unit 4 that is positioned by being moved for adjusting, in the direction shown by the arrow Y, which is the indexing direction and the direction shown by the arrow Z, which is the cutting-in direction, and is rotated, the semiconductor plate 10 held on the chuck table 3 is cut with the cutting blade 43 along the predetermined line 104 by moving the chuck table 3 in the cut-feeding direction below the cutting blade 43. When the semiconductor plate 10 is cut along the cutting lines 104, the semiconductor plate 10 is divided into individually packaged semiconductor chips (semiconductor packages) 100. The divided semiconductor packages 100 are not separated from one another by the action of the tape 9 and the state of the semiconductor plate 10 supported on the frame 8 is maintained. After the cutting of the semiconductor plate 10 is thus completed, the chuck table 3 holding the semiconductor plate 10 is returned to the position where it first suction-held the semiconductor plate 10 and its suction-holding of the semiconductor plate 10 is canceled there. The semiconductor plate 10 is then conveyed to the cleaning means 14 by the cleaning/conveying means 15 to be cleaned. The thus cleaned semiconductor plate 10 is conveyed to the workpiece placing area 11 by the workpiece conveying means 13. Then, the semiconductor plate 10 is stored at a predetermined position of the cassette 7 by the workpiece taking-out means 12.

Next, an embodiment of the cutting blade 43 constituted according to the present invention will be described with reference to FIG. 2 and FIG. 3.

Figure 2:
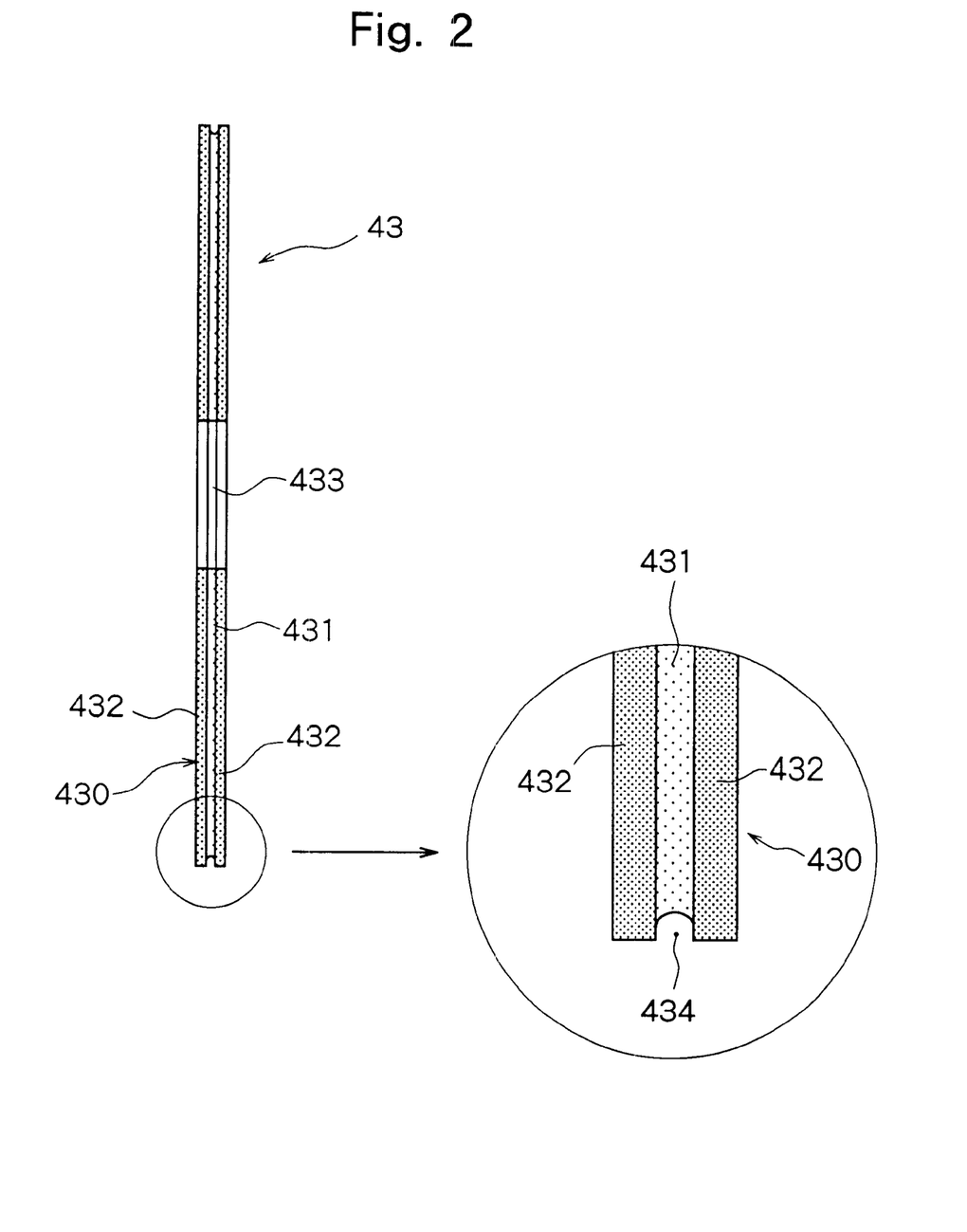
FIG. 2 is a sectional view of an embodiment of a cutting blade constituted according to the present invention.
Figure 3:
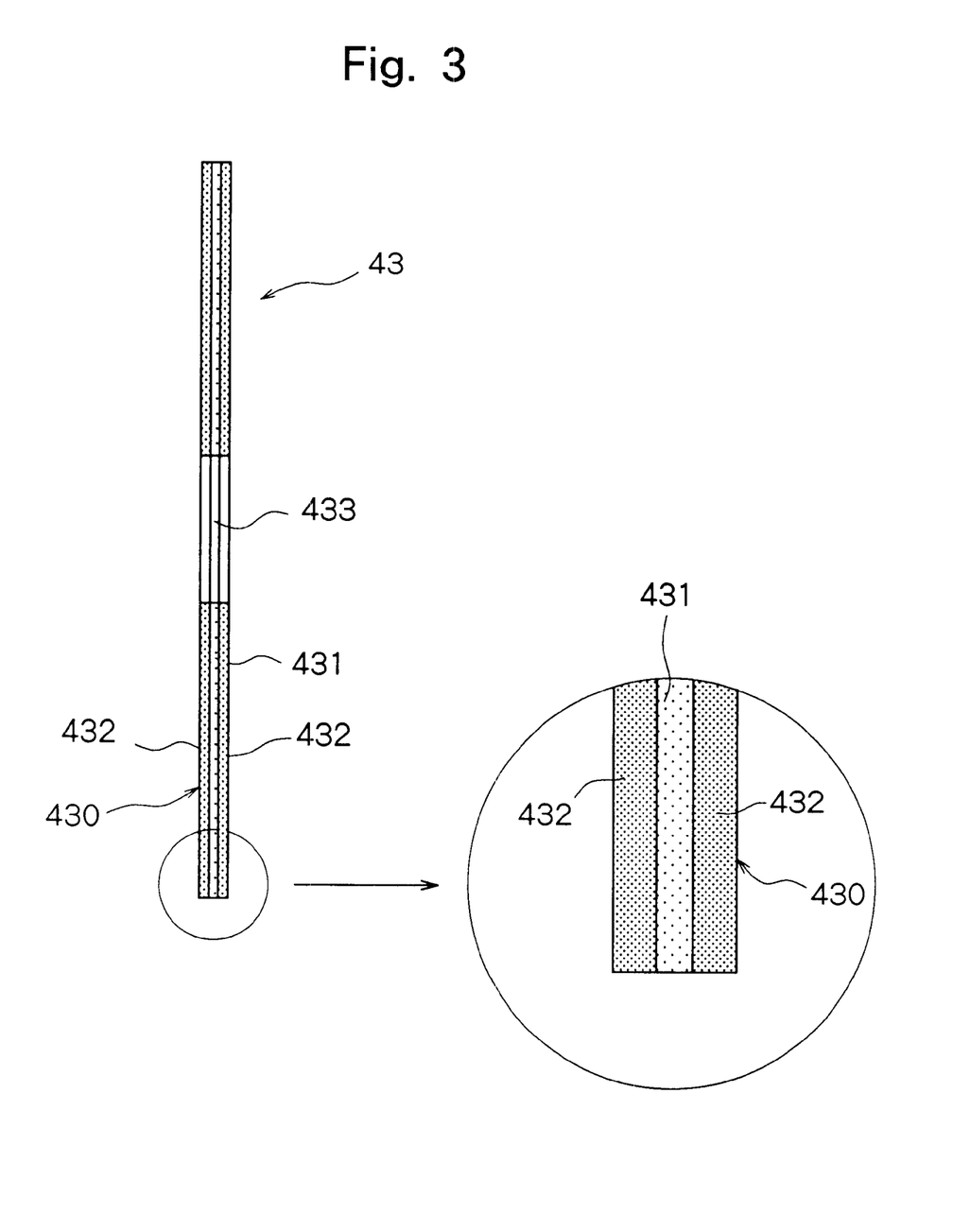
FIG. 3 is a sectional view of an annular assembly in the process for producing the cutting blade shown in FIG. 2.

The cutting blade 43 of the embodiment shown in FIG. 2 and FIG. 3 is a washer type blade, of which an annular cutting edge portion 430 is composed of three electroformed abrasive grain layers in which abrasive grains are fixed by electroforming, and an attachment hole 433 for mounting this cutting blade 43 to the above rotary spindle 42 is formed in the center portion thereof. The annular cutting edge portion 430 is composed of a central electroformed abrasive grain layer 431 and outer electroformed abrasive grain layers 432 and 432 formed on both sides of the central electroformed abrasive grain layer 431. The central electroformed abrasive grain layer is an abrasive grain layer having a low concentration and the outer abrasive grain layers 432 and 432 are each an abrasive grain layer having a higher concentration than the central electroformed abrasive grain layer 431. The concentration of abrasive grains of the central electroformed abrasive grain layer is preferably 0 to 100 and the concentration of abrasive grains of the outer electroformed abrasive grain layers 432 and 432 is preferably 200 to 300. The concentration of abrasive grains is set to 0 to 400. A concentration of 0 means that the amount of the abrasive grains is 0% based on the layer, a concentration of 200 means that the amount of the abrasive grains is 50% and a concentration of 400 means that the amount of abrasive grains is 100%. It is desired that the grain diameter of the abrasive grains should be set to ⅒ to ⅓ the thickness of the annular cutting edge portion 430, the thickness of the annular cutting edge portion should be set to 200 to 300 μm, and the grain diameter of the abrasive grains should be set to 20 to 60 μm. The abrasive grains are preferably diamond abrasive grains.

A description is subsequently given of an example of the method of producing the annular cutting edge portion 430 of the cutting blade 43 constituted as described above.

The central electroformed abrasive grain layer 431 is first produced by a known electroforming method. That is, diamond abrasive grains as large as 20 to 60 μm are added to a nickel sulfate solution held in a plating tank so as to become a concentration of 0 to 100, and one side of an annular substrate made from aluminum is plated with nickel in this plating solution containing the diamond abrasive grains added in the nickel sulfate solution to form a composite plating layer (the concentration of the diamond abrasive grains is 0 to 100) in which the diamond abrasive grains are fixed by nickel plating. The central electroformed abrasive grain layer 431 composed of this composite plating layer is formed to have a thickness of about 70 μm. Then, the composite plating layer formed on one side of the annular substrate is peeled off from the annular substrate, or the annular substrate is dissolved in an etching solution such as sodium hydroxide or the like to be removed, whereby the central electroformed abrasive grain layer 431 is formed.

Thereafter, the outer electroformed abrasive grain layers 432 and 432 are formed on both sides of the central electroformed abrasive grain layer 431 by the electroforming method. That is, the both sides of the above central electroformed abrasive grain layer 431 are plated with nickel in a plating solution prepared by adding diamond abrasive grains as large as 20 to 60 μm to a nickel sulfate solution contained in a plating tank so as to have a concentration of 200 to 300 to form the outer electroformed abrasive grain layers 432 and 432 which are each a composite plating layer (the concentration of the diamond abrasive grains is 200 to 300) in which the diamond abrasive grains are fixed by nickel plating. These outer electroformed abrasive grain layers 432 and 432 each formed of this composite plating layer are formed to have a thickness of about 100 μm.

After the cutting blade 43 having the cutting edge portion 430 composed of the central electroformed abrasive grain layer 431 and the outer electroformed abrasive grain layers 432 and 432 formed on both sides of the central electroformed abrasive grain layer 431 as shown in FIG. 3 is constructed as described above, when the peripheral surface of the cutting blade 43 is dressed with a suitable dress board, the central electroformed abrasive grain layer 431 is greatly worn away as shown in FIG. 2 and consequently, an annular depression 434 is formed in the center portion in the width direction of the peripheral surface of the annular cutting edge portion 430 because the central electroformed abrasive grain layer 431 is an abrasive grain layer having a lower concentration than the outer electroformed abrasive grain layers 432 and 432.

Figure 4:
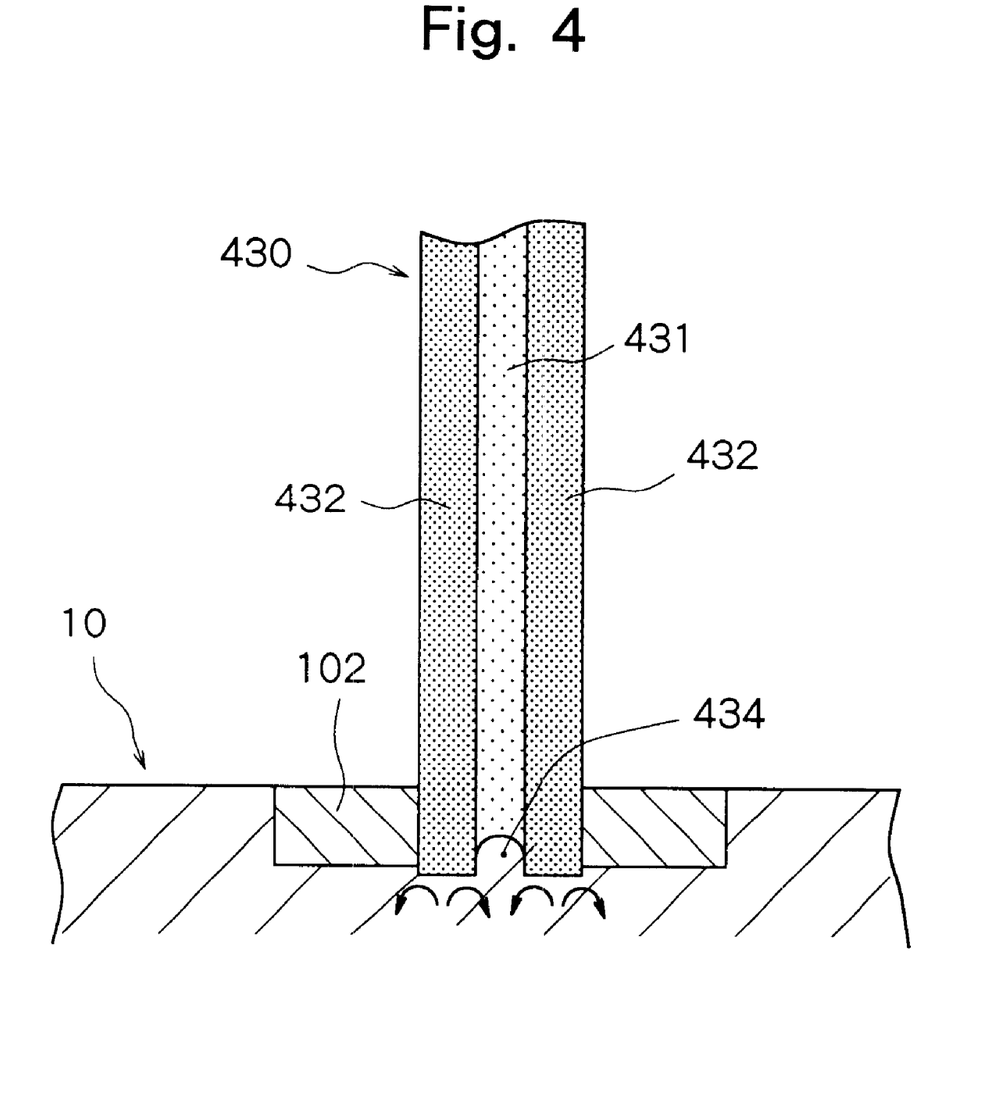
FIG. 4 is a diagram for explaining a state of a semiconductor plate being cut with the cutting blade shown in FIG. 2.

FIG. 4 shows that the semiconductor plate 10 shown in FIG. 6 is cut with the cutting blade 43 constituted as described above along the cutting line 104 formed at the intermediate portion of the electrode 102. That is, when the semiconductor plate 10 and the cutting blade 43 are relatively moved along the cutting line 104 formed therein while the cutting blade 43 is rotated, cuttings generated by cutting are taken in to the annular depression 434 side and removed by the rotation of the cutting blade 43, because the annular depression 434 is formed in the center portion in the width direction of the peripheral surface of the cutting edge portion 430 constituting the cutting blade 43 as shown in FIG. 4. Accordingly, there occurs no generation of burrs 110 as shown in FIG. 7 and FIG. 8. Further, as the annular cutting edge portion 430 constituting the above-described cutting blade 43 can be formed by the known electroforming method, it can be easily produced.

A description is subsequently given of another embodiment of the cutting blade constituted according to the present invention with reference to FIG. 5.

Figure 5:
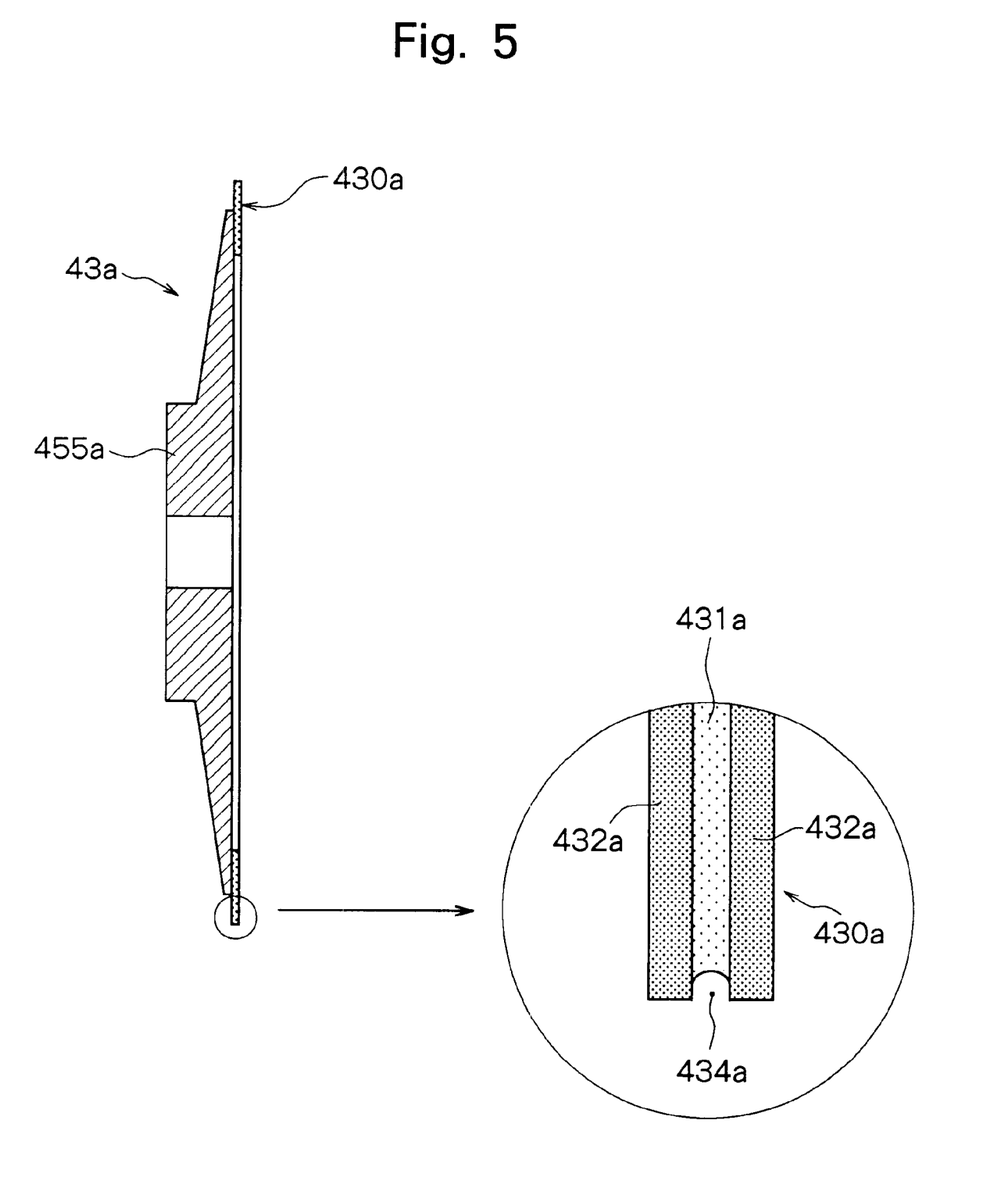
FIG. 5 is a sectional view of another embodiment of a cutting blade constituted according to the present invention.

The cutting blade 43a of this embodiment shown in FIG. 5 is a hub type blade which comprises a hub 455a to be mounted to the above rotary spindle 42 and an annular cutting edge portion 430a mounted to the periphery portion of one side of the hub 455a. The cutting edge portion 430a is constituted by three electroformed abrasive grain layers in which abrasive grains are fixed by electroforming like the cutting edge portion 430 of the above-described cutting blade 43. That is, the annular cutting edge portion 430a is composed of a central electroformed abrasive grain layer 431a and outer electroformed abrasive grain layers 432a and 432a formed on both sides of the central electroformed abrasive grain layer 431a. The central electroformed abrasive grain layer 431a is an abrasive grain layer having a low concentration (for example, the concentration of abrasive grains is 0 to 100) and the outer electroformed abrasive grain layers 432a and 432a are each an abrasive grain layer having a higher concentration than the central electroformed abrasive grain layer 431a (for example, the concentration of the abrasive grains is 200 to 300).

An example of the method of producing the hub type cutting blade 43a constituted as described above will be described hereinbelow.

One of the outer electroformed abrasive grain layers 432a is first formed on one side of the hub 455a by the known electroforming method. That is, the annular hub 455a made of aluminum is masked except the end portion of one side thereof, and the annular hub 455a masked except the end portion of one side thereof is plated with nickel in a plating solution prepared by adding diamond grains as large as 20 to 60 μm to a nickel sulfate solution so as to become a concentration of 200 to 300. As a result, an annular composite plating layer (the concentration of the diamond abrasive grains is 200 to 300) in which the diamond abrasive grains are fixed by nickel plating is formed on the end portion of one side of the hub 455a. The outer electroformed abrasive grain layer 432a formed of this composite plating layer is formed to have a thickness of about 100 μm.

The central electroformed abrasive grain layer 431a is then formed on the surface of the one outer electroformed abrasive grain layer 432a formed on the end portion of one side of the hub 455a, by the electroforming method. That is, the hub 455a having the outer electroformed abrasive grain layer 432a formed on the end portion of one side thereof is plated with nickel in a plating solution prepared by adding diamond abrasive grains as large as 20 to 60 μm to a nickel sulfate solution so as to become a concentration of 0 to 100. As a result, an annular composite plating layer (the concentration of the diamond abrasive grains is 0 to 100) in which the diamond abrasive grains are fixed by nickel plating is formed on the surface of the outer electroformed abrasive grain layer 432a formed on the end portion of one side of the hub 455a. The central electroformed abrasive grain layer 431a formed of this composite plating layer is formed to have a thickness of about 70 μm.

Subsequently, the other outer electroformed abrasive grain layer 432a is formed on the surface of the central electroformed abrasive grain layer 431a formed on the surface of the one outer electroformed abrasive grain layer 432a, by the electroforming method. That is, the hub 455a having the one outer electroformed abrasive grain layer 432a and the central electroformed abrasive grain layer 431a formed on the end portion of one side is plated with nickel in a plating solution prepared by adding diamond abrasive grains as large as 20 to 60 μm to a nickel sulfate solution so as to become a concentration of 200 to 300. As a result, a composite plating layer (the concentration of the diamond abrasive grains is 200 to 300) in which the diamond abrasive grains are fixed by nickel plating is formed on the surface of the above central electroformed abrasive grain layer 431a. The other outer electroformed abrasive grain layer 432a formed of this composite plating layer is formed to have a thickness of 100 μm.

After the one outer electroformed abrasive grain layer 432a, the central electroformed abrasive grain layer 431a and the other outer electroformed abrasive grain layer 432a are formed on one side of the end portion of the hub 455a as described above, the peripheral end portion of the hub 455a is dissolved in an etching solution such as sodium hydroxide or the like, to be removed, whereby the annular cutting edge portion 431a composed of the three electroformed abrasive grain layers at the periphery of the hub 455a is formed.

When the peripheral surface of the hub type cutting blade 43a having the annular cutting edge portion 430a composed of the three electroformed abrasive grain layers at the periphery of the hub 455a is dressed with a suitable dress board, the central electroformed abrasive grain layer 431a is greatly worn away and consequently, an annular depression 434a is formed in the center in the width direction of the peripheral surface of the annular cutting edge portion 430a because the central electroformed abrasive grain layer 431a is an abrasive grain layer having a lower concentration than the outer electroformed abrasive grain layers 432a and 432a like the above cutting blade 43. Therefore, the same function and effect as the above cutting blade 43 are obtained by cutting with this cutting blade 43a.

Since the cutting blade of the present invention is constituted as described above, the following function and effect are obtained.

That is, according to the present invention, the annular cutting edge portion constituting the cutting blade is composed of a central electroformed abrasive grain layer and outer electroformed abrasive grain layers formed on both sides of the central electroformed abrasive grain layer, the central electroformed abrasive grain layer is an abrasive grain layer having a low concentration, and the outer electroformed abrasive grain layers are each an abrasive grain layer having a higher concentration than the central electroformed abrasive grain layer. Therefore, the central electroformed abrasive grain layer is greatly worn away by dressing or use and consequently, an annular depression is formed in the center in the width direction of the peripheral surface of the annular cutting edge portion. When the semiconductor plate is cut with the cutting blade having the annular depression formed in the center in the width direction of the peripheral surface of the annular cutting edge portion, cuttings generated by cutting are taken in to the annular depression side and removed by the rotation of the cutting blade, thereby preventing the generation of burrs. Since the annular cutting edge portion constituting the cutting blade 43 of the present invention can be formed by the known electroforming method, its production is easy.

What is claimed is:

1. A cutting blade comprising an annular cutting edge portion composed of electroformed abrasive grain layers in which abrasive grains are fixed by electroforming, wherein said annular cutting edge portion is composed of a central electroformed abrasive grain layer and outer electroformed abrasive grain layers formed on both sides of said central electroformed abrasive grain layer; and said central electroformed abrasive grain layer is an abrasive grain layer having a low concentration, and said outer electroformed abrasive grain layers are each an abrasive grain layer having a higher concentration than said central electroformed abrasive grain layer.

2. The cutting blade of claim 1, wherein said central electroformed abrasive grain layer is an abrasive grain layer having a concentration of 0 to 100 and said outer electroformed abrasive grain layers are each an abrasive grain layer having a concentration of 200 to 300.

3. The cutting blade of claim 1, wherein the grain diameter of said abrasive grains is set to $\frac{1}{10}$ to $\frac{1}{3}$ the thickness of said annular cutting edge portion.

4. The cutting blade of claim 3, wherein the thickness of said annular cutting edge portion is set to 200 to 300 μm and the grain diameter of said abrasive grains is set to 20 to 60 μm.

5. The cutting blade of claim 1, wherein said abrasive grains are diamond abrasive grains.

* * * * *